United States Patent
Nørby et al.

(10) Patent No.: US 12,286,721 B2
(45) Date of Patent: Apr. 29, 2025

(54) METHOD FOR CHROMIUM UPGRADING OF FERRITIC STEEL INTERCONNECTS FOR SOLID OXIDE CELL STACK APPLICATIONS

(71) Applicant: HALDOR TOPSØE A/S, Kgs. Lyngby (DK)

(72) Inventors: Tobias Holt Nørby, Glostrup (DK); Rainer Küngas, Harjumaa (EE); Bengt Peter Gustav Blennow, Humlebæk (DK); Jeppe Rass-Hansen, Copenhagen (DK); Thomas Heiredal-Clausen, Birkerød (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 568 days.

(21) Appl. No.: 17/616,756

(22) PCT Filed: Jul. 13, 2020

(86) PCT No.: PCT/EP2020/069710
§ 371 (c)(1),
(2) Date: Dec. 6, 2021

(87) PCT Pub. No.: WO2021/009100
PCT Pub. Date: Jan. 21, 2021

(65) Prior Publication Data
US 2022/0298663 A1   Sep. 22, 2022

(30) Foreign Application Priority Data

Jul. 17, 2019 (DK) .......................... PA 2019 00882

(51) Int. Cl.
*C25D 3/04* (2006.01)
*C25D 5/36* (2006.01)
(Continued)

(52) U.S. Cl.
CPC ................ *C25D 3/04* (2013.01); *C25D 5/36* (2013.01); *C25D 5/50* (2013.01); *C25D 7/0692* (2013.01); *H01M 8/0228* (2013.01)

(58) Field of Classification Search
CPC ... C25D 3/04; C25D 5/36; C25D 5/50; C25D 7/0692; C25D 7/00; C25D 3/10;
(Continued)

(56) References Cited

U.S. PATENT DOCUMENTS 4,904,501 A   2/1990 Davis
6,321,691 B1  11/2001 Harth
(Continued)

FOREIGN PATENT DOCUMENTS

| | | |
|---|---|---|
| CA | 781423 A | 3/1968 |
| CN | 104393315 A | 3/2015 |

(Continued)

OTHER PUBLICATIONS

Grolig, J.G., et al., "Coated stainless steel 441 as interconnect material for solid oxide fuel cells: Oxidation performance and chromium evaporation", Journal of Power Sources, 2014, 248, pp. 1007-1013.
(Continued)

*Primary Examiner* — Abdullah A Riyami
*Assistant Examiner* — Nader J Alhawamdeh
(74) *Attorney, Agent, or Firm* — Boone IP Law

(57) ABSTRACT

In a method for chromium upgrading of interconnects made of ferritic steel to be used in solid oxide cell stacks, comprising the steps of shaping the interconnect, depositing a coating comprising Cr on at least one surface of the shaped interconnect and performing one or more thermal treatments at a temperature below 1000° C., the resulting Cr concentration near the surface of the interconnect is higher than the Cr concentration in the ferritic steel before shaping. Spe-
(Continued)

cifically, the average Cr concentration of the shaped interconnect is increased to 26 wt % Cr or higher.

16 Claims, 3 Drawing Sheets

(51) Int. Cl.
*C25D 5/50* (2006.01)
*C25D 7/06* (2006.01)
*H01M 8/0228* (2016.01)

(58) Field of Classification Search
CPC ....... H01M 8/0228; H01M 2008/1293; H01M 8/021; H01M 8/2432; H01M 8/1231; H01M 8/186; Y02E 60/50; C21D 1/26; C21D 6/002; C21D 2211/005; C21D 6/004; C21D 9/0068; C22C 38/18; C22C 38/40; C23C 10/40; C23C 10/42; C23C 10/60

See application file for complete search history.

(56) References Cited

U.S. PATENT DOCUMENTS

| | | | |
|---|---|---|---|
| 6,387,194 | B1 | 5/2002 | Zeigler et al. |
| 6,936,217 | B2 | 8/2005 | Quadadakkers et al. |
| 7,718,295 | B2 | 5/2010 | Haltiner et al. |
| 8,663,863 | B2 | 3/2014 | Erikstrup |
| 9,472,816 | B2 | 10/2016 | Brandner et al. |
| 10,907,254 | B2 * | 2/2021 | Holt Nørby ............. C25D 5/10 |
| 2008/0269495 | A1 | 10/2008 | Bose et al. |
| 2009/0253020 | A1 | 10/2009 | Niewolak et al. |
| 2009/0263678 | A1 | 10/2009 | Sasaoka et al. |
| 2010/0136380 | A1 | 6/2010 | Hendriksen et al. |
| 2012/0018493 | A1 * | 1/2012 | Baffie ................. H01M 8/2432 228/179.1 |
| 2016/0281184 | A1 | 9/2016 | Kela et al. |
| 2017/0058391 | A1 | 3/2017 | Li et al. |
| 2017/0058997 | A1 | 3/2017 | Asada et al. |
| 2019/0345613 | A1 * | 11/2019 | Holt Nørby ............. C25D 5/10 |
| 2019/0348688 | A1 | 11/2019 | Holt et al. |
| 2022/0298663 | A1 * | 9/2022 | Nørby ................... C21D 6/002 |

FOREIGN PATENT DOCUMENTS

| | | | | |
|---|---|---|---|---|
| EP | 1156273 | A1 | 11/2001 | |
| EP | 1600520 | A1 | 11/2005 | |
| EP | 1850412 | A1 | 10/2007 | |
| EP | 1452616 | B1 | 3/2009 | |
| EP | 2194597 | A1 | 6/2010 | |
| JP | 2008544452 | A | 12/2008 | |
| JP | 2014078489 | A | 5/2014 | |
| WO | 96/28855 | A1 | 9/1996 | |
| WO | 2006/059943 | A1 | 6/2006 | |
| WO | 2006138070 | A1 | 12/2006 | |
| WO | 2008013498 | A1 | 1/2008 | |
| WO | 2008/109652 | A2 | 9/2008 | |
| WO | 2012/062341 | A1 | 5/2012 | |
| WO | 2013101574 | A1 | 7/2013 | |
| WO | 2014174975 | A1 | 10/2014 | |
| WO | 2017174976 | A1 | 10/2017 | |
| WO | 2017201418 | A1 | 11/2017 | |
| WO | WO-2018108471 | A1 * | 6/2018 | ............. C23C 18/54 |

OTHER PUBLICATIONS

U.S. Appl. No. 18/286,429, Tobias Holt Nørby, filed Oct. 11, 2023.
Danish Search Report mailed on Jan. 28, 2020, by the Danish Patent Office for Danish Application No. PA 2019 00882 (9 pages).
International Search Report (PCT/ISA/210) and Written Opinion (PCT/ISA/237) mailed on Sep. 30, 2020, by the European Patent Office as the International Searching Authority for International Application No. PCT/EP2020/069710 (12 pages).
European Search Report mailed on Oct. 20, 2021, by the European Patent Office for European Application No. 21172464.6.
International Preliminary Report on Patentability received for PCT Patent Application No. PCT/EP2020/069710, mailed on.
International Search Report and Written Opinion received for PCT Patent Application No. PCT/EP2022/062350, mailed on Aug. 18, 2022, 11 pages.
Office Action with English translation mailed on Apr. 22, 2024, by the Intellectual Property Office (TIPO) for Taiwan Application No. (109124088), 10 pages.
Notice of Reasons for Refusal prepared on Jun. 20, 2024, by the Japanese Patent Office for Japanese Application No. 2022-502113, 16 pages.

* cited by examiner

METHOD FOR CHROMIUM UPGRADING OF FERRITIC STEEL INTERCONNECTS FOR SOLID OXIDE CELL STACK APPLICATIONS

FIELD OF THE INVENTION

The present invention relates to chromium upgrading of ferritic steel materials, more specifically chromium upgrading of ferritic steel interconnects to be used in solid oxide cell (SOC) stacks.

BACKGROUND

Stainless steels are iron alloys with a minimum Cr content of 10.5 wt % and a maximum content of 1.2 wt % carbon.

Stainless steels are divided into different families based on their crystalline structure: austenitic, ferritic, duplex and martensitic. The largest group of stainless steels is austenitic. The austenitic stainless steels can further be divided into five sub-groups: Cr—Mn, Cr—Ni, Cr—Ni—Mo, high-performance, and high-temperature. The most common austenitic steels are Cr—Ni, which contain 8-10 wt % Ni and 17-18 wt % Cr, balance Fe, and are often referred to as 18-8 type of stainless steels. The Ni in the steel is required to stabilize the austenite phase ($\gamma$-Fe) with a face-centered cubic (FCC) crystal structure that remains stable at room temperature. Austenitic grades are classified as non-magnetic with good weldability and formability.

Ferritic stainless steel is the second most used group of stainless steels and are often referred to as the "nickel free" alternative to austenitic steels. The ferritic steels contain primarily Fe and Cr, and the Cr content can vary over a wide range (from 10.5 to 29 wt %), depending on the application. Ferritic steels can be further sub-divided into five different groups. Group 1-3 has the widest range of applications and therefore also the largest production volume of the ferritic steels. Group 1-3 steels are often referred to as the "standard ferritic grades". Group 1 has the lowest content of Cr (in the range 10.5 to 14 wt %), whereas group 2-3 has a range of 14 to 18 wt % Cr. Group 2 is the most widely used family of ferritic stainless steels. AISI 430 is a particularly widely used type of Group 2 stainless steel, which has outcompeted the austenitic alternative AISI 304 for many indoor applications, where corrosion-resistance is of lesser importance, but where lower price volatility (due to the Ni-free formulation) is desired. Group 3 is distinguished from group 2 by its content of additional stabilizing elements, such as Ti, Nb and Zr, that tie up both carbon and nitrogen, leaving a fully ferritic crystal structure at all temperatures. The group 3 family, therefore, in general exhibit a better weldability and resistance to sensitization than the other groups. Group 4 has 10.5 to 18 wt % Cr and is alloyed with Mo for additional corrosion resistance. The group 5 ferritics have higher than 18 wt % of Cr alloyed or do not belong to the other groups. Typically, group 5 ferritic steels have very high corrosion resistance but low weldability, and they are also sensitive to embrittlement. The grades in group 5 with both high Cr and Mo are referred to as "super ferritics" and are designed to replace titanium in applications, where corrosion is considered extreme. Ferritic stainless steels have a body centered cubic (BCC) crystal structure ($\alpha$-Fe), are magnetic, and have a lower thermal expansion coefficient than austenitic steels.

Duplex is another group of stainless steels. Duplex steel is basically a mixture of ferritic and austenitic phases with an approximate phase balance of 50% ferrite and 50% austenite. Duplex stainless steel is characterized by a high Cr content (20.1 to 25.4 wt % Cr) but a rather low content of Ni (1.4 to 7 wt % Ni). In duplex steels, many of the beneficial properties from both the austenitic and ferritic steels are combined. Duplex grades are magnetic due to the ferrite content.

Martensitic stainless steels are the smallest group of the stainless steels. The martensitic steels typically contain 12-17 wt % Cr and Ni in the range of 0-5 wt %. It is the combination of alloy composition and the high cooling rate during quenching that transforms the microstructure into martensite with a body centered tetragonal (BCT) crystal structure. Martensitic steels are hardenable and magnetic.

Solid oxide cells (SOCs) can be operated as solid oxide fuel cells (SOFCs), as solid oxide electrolysis cells (SOECs) or reversibly, i.e. switching between SOFC and SOEC mode.

A solid oxide fuel cell comprises an oxygen-ion conducting electrolyte, an oxygen electrode (cathode) at which oxygen is reduced and a fuel electrode (anode) at which fuel (e.g. hydrogen, methane or natural gas) is oxidized. The overall reaction in an SOFC is that the used fuel and oxygen react electrochemically to produce electricity, heat and an oxidized species. The oxidized species is water if hydrogen is used as fuel, carbon dioxide if carbon monoxide is used as fuel, and a mixture of water and carbon dioxide for hydrocarbon fuels.

A solid oxide electrolysis cell comprises an oxygen-ion conducting electrolyte, a fuel electrode (cathode) at which an oxidized species (e.g. water or carbon dioxide or both) is reduced with the aid of an externally applied electric field, and an oxygen electrode (anode) at which oxygen ions are oxidized to molecular oxygen. The overall reaction in an SOEC is that the oxidized species are converted electrochemically into reduced species using electricity and heat. If the oxidized species fed into the stack is water, hydrogen is formed on the fuel electrode. If the oxidized species is carbon dioxide, carbon monoxide is formed on the fuel electrode. If the oxidized species is a mixture of water and carbon dioxide, then a mixture of carbon monoxide and hydrogen (also known as synthesis gas) is produced.

An SOC operates at a temperature range from about 500° C. to about 1100° C. Elevated operating temperatures are needed to ensure sufficiently high oxygen ion conductivity in the electrolyte. Commonly used electrolyte materials for SOCs include but are not limited to yttria-stabilized zirconia (YSZ) and gadolinia-doped ceria (CGO).

In an SOC stack, a plurality of cells, each including a fuel electrode, an electrolyte, an oxygen electrode, and optionally additional layers, are connected in series by interposing interconnection plates (or "interconnects" or "interconnectors") between each pair of cells. The role of the interconnects is to provide electrical contact from one cell to the next, to aid in the distribution of gases across the cell and—in some designs—to avoid mixing of gases between the anode and cathode compartments.

Interconnects can either be made of ceramic materials, such as doped lanthanum or yttrium chromites, or they can be made of metals, such as stainless steel. The advantages of metallic interconnects over ceramic interconnects include: 1) lower material and fabrication costs, 2) shaping is easier and less complex, 3) higher electrical and thermal conductivity, 4) ductility. Therefore, for SOCs operating at temperatures below 850° C., metallic interconnects are preferred.

Suitable materials for metallic SOC interconnects need to be oxidation resistant against gases fed to both oxygen and fuel electrodes under elevated operation temperatures, and they must also exhibit a coefficient of thermal expansion (CTE) that matches the CTE of the ceramic components of the cell. Furthermore, the protective oxide barrier that forms on the surface of the steel at high temperatures much be electrically conducting. In view of these requirements, ferritic alloys forming chromium oxide surface layers (e.g. chromia-forming ferritic steels) are particularly suitable for use as interconnects in SOC stack applications. Examples of such high-chromium ferritic steels include, but are not limited to AISI 441, AISI 444, AISI 430, AISI 446, Crofer 22H, Crofer 22APU, ZMG G10, E-brite, Plansee ITM, etc. Other materials used for metallic SOC interconnects include Plansee CFY (an alloy based on <95 wt % Cr, 5 wt % Fe and Y).

For example, U.S. Pat. No. 6,936,217 B2 describes a high temperature material which consists of a chromium oxide forming iron alloy including: a) 12 to 28 wt % Cr, b) 0.01 to 0.4 wt % La, c) 0.2 to 1.0 wt % Mn, d) 0.05 to 0.4 wt % Ti, e) less than 0.2 wt % Si, f) less than 0.2 wt % Al, wherein, at temperatures of 700° C. to 950° C., the high temperature material is capable of forming a $MnCr_2O_4$ spinel phase. A ferritic stainless steel covered by the description above has been commercialized under a tradename Crofer 22APU. The CTE of Crofer 22APU between 20° C. and 800° C. is 11.9 ppm $K^{-1}$.

WO 2008/013498 A1, which belongs to the Applicant, deals with a ferritic chromium stainless steel comprising: a) 20 to 25 wt % Cr, b) 0.5 to 2 wt % Mo, c) 0.3 to 1.5 wt % Nb, d) max 0.1 wt % C, e) max 0.6 wt % Mn, f) max 2 wt % Ni, g) max 0.5 wt % Ti, h) max 0.5 wt % Zr, i) max 0.1 wt % Al, j) max 0.07 wt % N, k) max 0.3 wt % rear earth metals, 1) balance Fe and normally occurring impurities, wherein the content of Zr+Ti is at least 0.20 wt %. Furthermore, the most preferred embodiment is a steel with an approximate composition (in percent by weight): Si—0.2, Mn—0.3, Cr—22, Mo—1, Nb—0.4, Zr—0.3, Ti—0.05, balance Fe and normally occurring impurities. The described steel is suitable for use as interconnects in fuel cells, such as solid oxide fuel cells due to the good adhesion of the oxide formed on the surface of the material, and low electrical contact resistance, when tested in contact with $(La,Sr)MnO_3$ plates in air at 750° C.

The corrosion rate of ferritic stainless steels is highly dependent on the Cr content in the steel. For example, I. G. Wight in Metals Handbook, 9th Edition, Vol. 13 Corrosion (1987) teaches that the parabolic rate constant for corrosion in Fe—Cr alloys decreases by more than four orders of magnitude at 1000° C., as the Cr content in the alloy is increased from 0 to 20 wt % Cr. At Cr contents lower than approximately 28 wt %, oxide scale formed on the surface of the alloy consists of layers of Fe— or Fe—Cr mixed oxides, resulting in incomplete protection of the steel. At Cr contents higher than approximately 28 wt %, oxide scale formed on the surface of the alloy consists of pure and continuous Cr-oxide, providing a more complete protection of the steel (i.e lowest corrosion rate). Therefore, for SOC applications, it is desirable to use ferritic stainless steels with a Cr content above 28 wt %. Slightly lower Cr contents (e.g. 26 wt %) may be sufficient, when the SOC stack is operated at temperatures lower than 1000° C. Unfortunately, the Cr content in most widely used ferritic steels is not high enough to withstand prolonged exposure to SOC conditions.

The problem regarding implementation of group 1-3 ferritic stainless steels (17-18 wt %) for SOC interconnects is commonly addressed with high-temperature oxidation resistant coatings. For example, J. G. Grolig et al. in Journal of Power Sources, 248 (2014) 1007-1013 demonstrate that the corrosion rate of AISI 441 with a chromium content of 17.83 wt %, when exposed to SOFC cathode conditions of 850° C. in air with 3% water content, can be decreased by protective coatings comprising cerium or lanthanum, or by double-layer coatings of cerium or lanthanum in combination with cobalt.

The coatings were applied by physical vapour deposition. The main disadvantage of such coatings is that they do not offer protection against corrosion, in case the coating is damaged, e.g. due to defects, cracks, pinholes, poor adhesion etc. If the coating fails, then the steel will most likely be subjected to heavy iron oxidation due to low Cr levels, causing SOC stacks to fail. Furthermore, shaping of the steel after coating damages the conformality of the coating, resulting in an incomplete corrosion protection.

The coefficient of thermal expansion (CTE) of Fe—Cr alloys is also dependent on the Cr content of the alloy. Generally, the CTE of the alloy decreases with increasing Cr content. For example, the CTE of AISI 430 (16-18 wt % Cr), measured between 25° C. and 727° C., is 12.94 ppm/K. The CTE of Crofer 22 APU (20-24 wt % Cr), measured between 20° C. and 800° C., is 11.9 ppm/K. The CTE of Plansee ITM (26 wt % Cr), measured between room temperature and 800° C., is 11.6 ppm/K. The CTE of CFY (95 wt % Cr), measured between room temperature and 800° C., is 10.5 ppm/K. The optimal CTE value to match the CTE of 40 vol % Ni—60 vol % 8YSZ (8 mol % yttria-stabilized zirconia) support layer in SOC would be 12.5 ppm/K (F. Tietz, Ionics, 5 (1999) 129).

Shaping of metals in manufacturing can be divided into two main categories: The material retaining processes and the material removal processes. The material retaining processes are normally classified as forming or deformation processes and are processes where the material undergoes plastic deformation in the creation of a shape. Formability is a term that is often are used in manufacturing of metals in the material retaining processes category. The term "formability" describes the ability of metals to undergo plastic deformation into a desired shape without damage to the workpiece. Examples of damage during plastic deformation include tearing or fracture formation. Examples of forming processes are, but not limited to: stamping, forging, rolling, extrusion, roll-forming and hydroforming. The material removal processes are explained by a process that shapes the metal by removing material from a work-piece and is most often referred to as machining. Machining includes a large variety of different processes and are divided into three different categories: mechanical, chemical and thermal machining. In mechanical machining, a tool is removing material by cutting or by abrasion. Chemical machining and or electrochemical machining are defined as processes that remove material by etching material away from a work-piece in order to obtain the desired shape. Thermal machining uses often electrical energy to vaporize material away from the work-piece. The term "machinability" is therefore very broad, as it covers many different processes. However, the meaning of the term is the material's ability to be removed from a work-piece.

For example, U.S. Pat. No. 8,663,863 B2, which belongs to the Applicant, describes an interconnect for a fuel cell made of a metal sheet with protruding contact areas. The protrusions can be made by shaping the metal sheet by any known process such as stamping, pressing, milling, deep drawing and the like.

U.S. Pat. No. 7,718,295 B2 describes a method that involves shaping of interconnects for planar solid oxide fuel cells by etching. Suitable processes include photochemical and electrochemical etching and laser cutting, among others.

In U.S. Pat. No. 9,472,816 B2, a powder metallurgy moulded part is made from a powder consisting of 95% by weight Cr and 5% by weight FeY master alloy (alloy comprising 0.5% by weight Y). 1% by weight of a pressing aid (wax) is added to this powder batch. Then, the powder batch is mixed in a tumble mixer for 15 minutes. A pressing tool is used to press the powder into a compact, which is pre-sintered at 1100° C. for 20 minutes in a hydrogen atmosphere in a continuous belt furnace for the purpose of dewaxing. This is followed by high-temperature sintering of the component at 1400° C. for 7 hours in a hydrogen atmosphere for the purpose of further compaction and alloy formation. This is followed by preoxidation of the component at 950° C. for a period of 10 to 30 hours in order to close up residual porosity which may be present to an extent that the permeability of the material is sufficiently low. Finally, the surfaces of the component are freed of the oxide layer on all sides by a sand blasting process. The described example involves many high-temperature sintering steps, some in hydrogen atmosphere, and further involves the use of metallic powder with strict particle size and shape requirements, making the process very expensive. Furthermore, the size of the interconnect plates produced via powder metallurgy are limited by the size of the mould and the pressing power of the press.

US 2008/0269495 A1 describes a method for producing a metallic interconnect for a fuel cell stack, which includes providing a sheet metal blank and forming the sheet metal blank by a plastic moulding process. The main disadvantage of the method is that extremely high pressing powers (1000 kN/cm² or 10000 bar) are needed to emboss the sheet metal blanks, which severely limits the size of interconnect plates that can be produced using the method.

Generally, the formability of ferritic stainless steels deteriorates as the Cr content in the steel increases. For example, Design Guidelines for the Selection and Use of Stainless Steel (Nickel Development Institute, A Designers' handbook Series No. 9014) teaches that AISI 430 steel (16-18 wt % Cr) rates as "excellent" in terms of the ease of coining, embossing and roll forming, whereas AISI 446 steel (23-27 wt % Cr) rates as "good". AISI 430 steel further rates "excellent" in terms of the ease of cold heading and spinning, whereas AISI 446 steel rates as "fair".

Several different parameters can be used to quantitatively describe different aspects of formability in steels. Used parameters include, but are not limited to the work hardening exponent, the tensile strength to yield strength ratio, total elongation, uniform elongation, and the r-value. The work hardening exponent describes the stretchability of the steel, total elongation characterizes the bendability of the steel, uniform elongation correlates with the sheet stretching capabilities of the steel, and the r-value correlates with the deep drawing capabilities of the steel. For example, the elongation ($A_5$) of AISI 430 steel (16-18 wt % Cr) is ≥20-28%, whereas elongation ($A_5$) of AISI 446 steel (23-27 wt % Cr)≥10%, indicating that formability decreases as the Cr content increases.

For example, US 2016/0281184 A1 relates to a ferritic stainless steel having excellent corrosion and sheet forming properties. The steel contains 20-24 wt % Cr and has a uniform elongation ($A_g$) between 17.0% and 19.1%, and an r-value between 1.81 and 2.55.

A ferritic stainless steel sheet, excellent in press formability and operability is described in EP 1 452 616 B1. The content of Cr in this steel sheet is 10-19 wt %, and the steel sheet has lubricating film or films on one or both of the surfaces. The main disadvantage of the invention is that due to the low Cr content, the steel does not offer good enough corrosion protection under SOC conditions.

Therefore, for SOC applications, it is desirable to use stainless steels with the following properties: 1) high oxidation resistance in both reducing and oxidizing atmospheres, 2) coefficient of thermal expansion (CTE) that matches the CTE of the SOC, 3) ability to form electrically conducting oxide scales, 4) easy formability or machinability, 5) low cost, and 6) wide availability (i.e. a wide range of suppliers).

Ferritic stainless steels specifically developed for SOC applications, such as Plansee ITM (26 wt % Cr), offers excellent oxidation resistance due to their high Cr content. The ITM steel further forms a Cr-oxide based scale, which is more conducting than alumina- or silica-based scales. The main disadvantage of the high-Cr steels is related to the difficulties in shaping the material: for example, interconnects made of Plansee ITM are fabricated via powder metallurgy. Due to the expensive shaping process and the low production volume of these steels, interconnects made of such steels are very expensive. Furthermore, the limited availability of the steel is an issue. Finally, the CTE of such steels is not optimal: the CTE of Plansee ITM is 11.6 ppm/K, whereas the optimal CTE value to match the CTE of 40 vol % Ni—60 vol % 8YSZ, used in SOC would be 12.5 ppm/K (F. Tietz, Ionics, 5 (1999) 129).

On the other hand, standard ferritic stainless steels, such as group 2 ferritic stainless steels are easy to shape, widely available, produced in large quantities and inexpensive, but have a lower Cr content (16-18 wt % Cr for AISI 430). The lower Cr content gives the material inferior corrosion resistance which, in turn, decreases the lifetime of SOC stacks to unacceptably low levels. The CTE of commonly used ferritic stainless steels varies somewhat, but AISI 430, for example, has a CTE of 12.94 ppm/K, i.e. slightly too high to match ideally with the CTE of 40 vol % Ni—60 vol % 8YSZ.

Therefore, it is the goal of the present invention to provide a method for preparing metallic SOC interconnects, which combine the benefits of standard ferritic stainless steel (i.e. low cost, wide availability, ease of shaping) with excellent oxidation resistance. It is furthermore a goal of the invention to provide an interconnect of ferritic steel to be used in solid oxide cell stacks that are low-cost, widely available, easy to shape and which possess excellent oxidation resistance.

SUMMARY OF THE INVENTION

According to the invention, the goal is achieved with a method for chromium upgrading of interconnects made of ferritic steel to be used in solid oxide cell stacks, comprising the steps of
- shaping the interconnect,
- depositing a coating comprising Cr on at least one surface of the shaped interconnect, and
- performing one or more thermal treatments at a temperature below 1000° C.,
- whereby the resulting Cr concentration near the surface of the interconnect is higher than the Cr concentration in the ferritic steel before shaping.

Here, the term "chromium upgrading" refers to a means of increasing the Cr content in a material. The term "shaping of the interconnect", refers to either forming or machining of the interconnect into the desired shape. The term "shaped interconnect" refers to an interconnect that has been formed or machined into the desired shape.

Advantageously, the average Cr concentration of the shaped interconnect is increased to 26 wt % Cr or higher.

Advantageously, the ferritic steel is a group 1 ferritic steel, group 2 ferritic steel, group 3 ferritic steel, group 4 ferritic steel or one of the following steels: Crofer22APU, Crofer22H or ZMG G10.

Advantageously, the ferritic steel is a group 2 ferritic steel, such as AISI 430.

Thereby, the method of the present invention allows SOC interconnects to be made of e.g. low-cost, easy-to-shape, widely available ferritic stainless steels, while simultaneously achieving excellent corrosion resistance. This is achieved by first shaping the interconnect into the desired shape, thereby taking advantage of the ease of shaping of steels with a relatively low Cr content. Shaping is followed by increasing the Cr content of the shaped interconnect, thereby taking advantage of the higher corrosion resistance of steels with a relatively high Cr content. Ferrite displays a very high solubility of chromium and a very low carbon content, and therefore, both solubility and carbide formation are unproblematic with respect to increasing the Cr content using the method of the invention.

Advantageously, the deposition step can be characterized as hard chromium plating.

The methods for the electroplating of chromium can be divided into the following two categories: hard chromium plating and bright chromium plating. The main difference, but important for the application, between hard and bright chromium plating is the layer thickness of the coating. Hard chromium plating provides relatively thick coatings that vary from 1 to 1000 μm in thickness and are mostly used as wear- and corrosion-resistant coatings for technical purposes. Bright chromium plating provides layer thicknesses in the range 0.25-1 μm, and they are therefore mostly used to improve the appearance of a surface for decorative purposes. The terms "technical hard chrome" and "decorative bright chrome" are also often used to describe the difference between the coatings. This sub-division of the two chromium plating processes is done despite their similarity in electroplating bath composition. The conventional sulfate catalyzed chromium electrolytes are, in principle, so close in composition that they can be used for plating both hard and bright chromium coatings (see the below Table 1). The main difference between the two bath compositions is that hard chromium plating can operate at much higher current densities, enabling faster deposition rates compared to the bright chromium plating process.

TABLE 1

Composition of hard and bright chromium electroplating baths, based upon the traditionally sulfuric acid catalyzed process.

| | Hard chromium | Bright chromium |
|---|---|---|
| $CrO_3$ [g/L] | 250 | 400 |
| $H_2SO_4$ [g/L] | 2.5 | 4.0 |
| Current density [A/dm$^2$] | 15-70 | 10-20 |
| Temperature ° C. | 45-60 | 35-45 |

The conventional sulfate-catalyzed processes, also known as the standard 100:1 sulfate baths (i.e. ratio 100:1 between chromium trioxide and sulfate, respectively), are historically the most widespread baths used for the electroplating of chromium. However, the fact that chromium cannot be reduced from hexavalent chromium (Cr(VI)) to its metallic state (Cr) without the presence of one or more catalysts has driven the industry to further optimize the catalysts used in the hard chromium processes. This catalyst development has not only resulted in electroplating baths with much higher current efficiencies but have also improved the properties of the hard chromium coatings. Examples of such improved properties are higher hardness, more crack-free deposits and also low substrate etching.

The industrial standards of hard chromium electrolytes have, as mentioned above, been developed and are today subdivided into the three different groups, listed in Table 2 below. All of the electrolytes are based on chromium trioxide and sulfate.

TABLE 2

Description of the predominant groups of hard chromium processes that are used today by the hard chromium plating industry.

| | Group 1 | Group 2 | Group 3 |
|---|---|---|---|
| Description | Conventional | Etch free, high efficiency | Fluoride based (mixed catalyst) |
| Catalyst | Sulfuric acid | Contains a non-halide such as sulfate in combination with an organic sulfonic acid | Hydrofluoric acid (HF), hexafluoric silic acid ($H_2SiF_6$), where the sulfate and fluoride compounds acts as catalysts |

Advantageously, the thickness of the coating deposited by hard chromium plating on the shaped interconnect is at least 1 micron and less than 1 millimeter.

Advantageously, the deposition step is can be characterized as a chromizing process.

Chromizing is a thermochemical process that involves saturating ferrous alloys, predominantly of steel, with chromium by way of diffusion. It is carried out in order to extend the service life of tools and components exposed to wear and corrosion, including gas corrosion, at temperatures up to 900° C. Chromizing involves a source metal powder (in this case Cr), an activator (e.g. a halide) and a diluent (an inert powder, such as $Al_2O_3$, that prevents the packed powder particles from sintering together), and the method is often referred to as "pack cementation". Group 1-3 ferritic steels have a very low carbon content and are characterized by a high solubility of Cr, therefore the chromizing process especially favors metallic Cr to diffuse into the ferritic crystalline structure. The activator keeps the interface free from oxides and allows diffusion of the source metal. Chromizing is classified into two types according to its application: anti-corrosion and surface hardening.

In U.S. Pat. No. 6,387,194 B1, a process for chromizing 400-series, especially 430, stainless steel components is described. A diffusion coating composition for use in the process is described also.

Advantageously, the shaping of the interconnect is carried out by forming.

Advantageously, the forming is carried out by stamping, pressing, forging, rolling, coining, embossing, extrusion, roll-forming, hydroforming or deep-drawing.

Advantageously, the pressing power used for forming of the interconnect is less than 500 bar, and preferably less than 200 bar.

Advantageously, the shaping of the interconnect is carried out by machining.

Advantageously, the machining is carried out by drilling, milling, photochemical etching, electrochemical etching, dry etching, or laser cutting.

Advantageously, the coefficient of thermal expansion of the interconnect after chromium upgrading is higher than 12 ppm/K, but lower than 13 ppm/K.

Thereby, the method of the present invention allows SOC interconnects to be made of e.g. ferritic stainless steels with a relatively low chromium content, such as AISI 430, the CTE of which is higher than the optimal value of approximately 12.5 ppm/K, and, by chromium upgrading, decrease the CTE of the steel closer to the optimal value.

BRIEF DESCRIPTION OF THE DRAWINGS

The invention will be explained in more detail hereinafter with reference to the drawings.

DETAILED DESCRIPTION OF THE DRAWINGS

Figure 1:
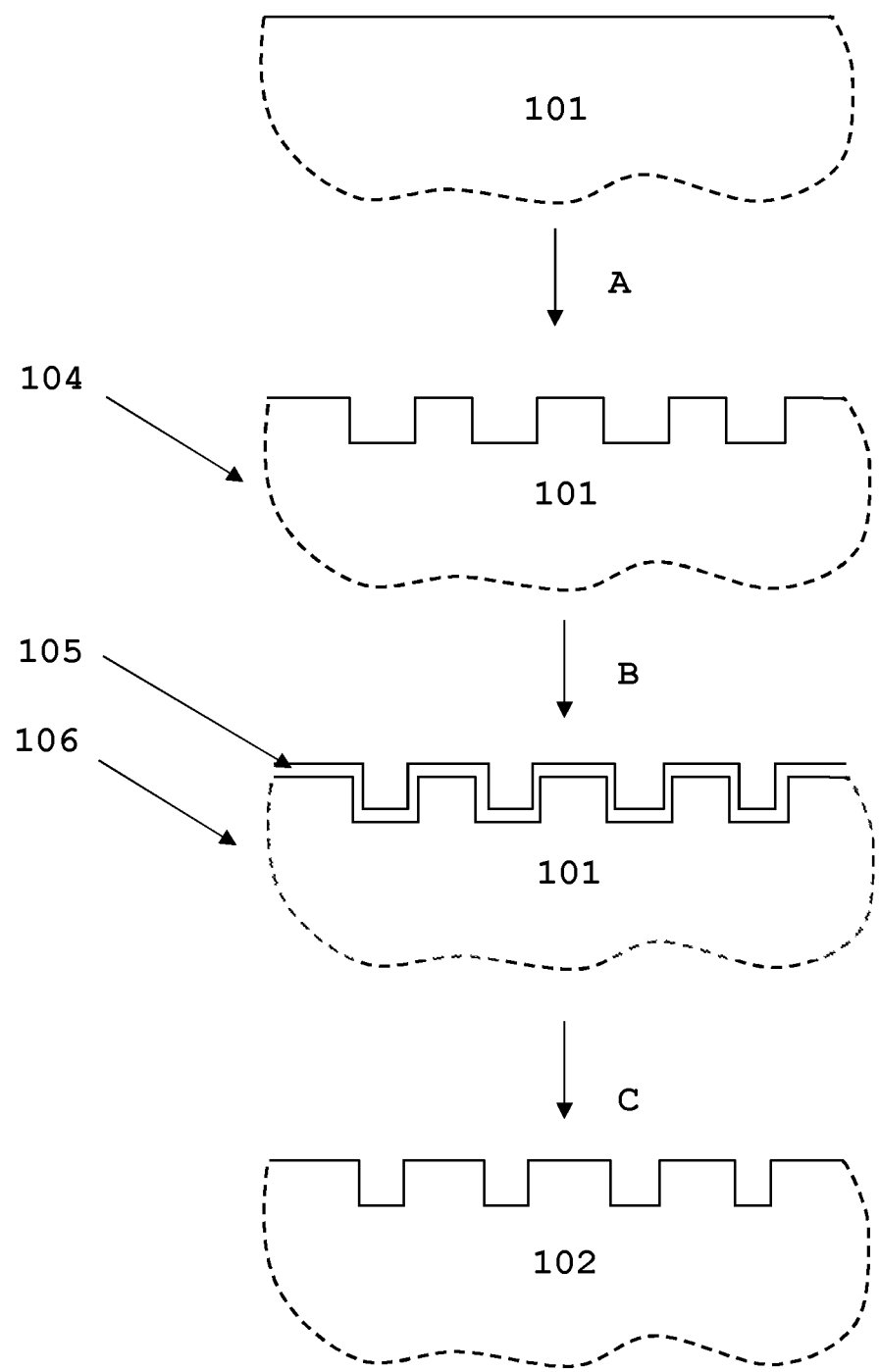
FIG. 1 is a schematic illustration of the method according to one embodiment of the invention, wherein the deposition step can be characterized as hard chromium plating.

FIG. 1 illustrates one possible embodiment of the invention. Ferritic stainless steel (101) is first shaped (process A) into a shaped SOC interconnect (104). Thereafter, a coating comprising Cr (105) is deposited by hard chromium plating (process B) on at least one surface of the shaped interconnect (104), whereby a coated SOC interconnect (106) is obtained. Then, one or more thermal treatments (process C) are performed at temperatures below 1000° C., whereby a chromium-upgraded SOC interconnect (102) is obtained. The resulting Cr concentration near the surface of the chromium-upgraded interconnect (102) is higher than the Cr concentration in the ferritic steel before shaping (101).

Figure 2:
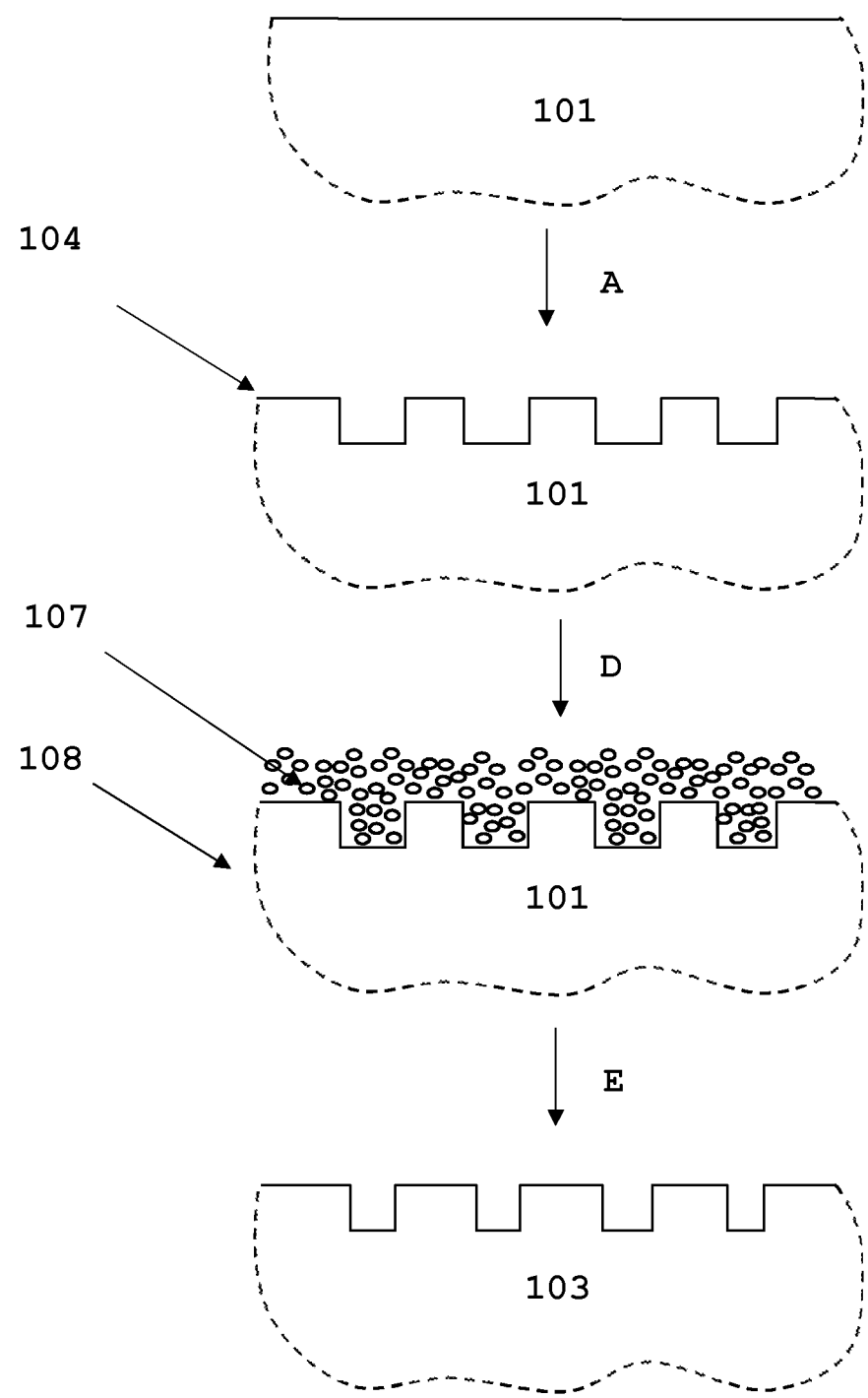
FIG. 2 is a schematic illustration of the method according to one embodiment of the invention, wherein the deposition step can be characterized as a chromizing process.

FIG. 2 illustrates one possible embodiment of the invention. Ferritic stainless steel (101) is first shaped (process A) into a shaped SOC interconnect (104). Thereafter, a coating comprising Cr (107) is deposited by a chromizing process (process D) on at least one surface of the shaped interconnect (104), whereby a coated SOC interconnect (108) is obtained. Then, one or more thermal treatments (process E) are performed at temperatures below 1000° C., whereby a chromium-upgraded SOC interconnect (103) is obtained. The resulting Cr concentration near the surface of the chromium-upgraded interconnect (103) is higher than the Cr concentration in the ferritic steel before shaping (101).

Figure 3:
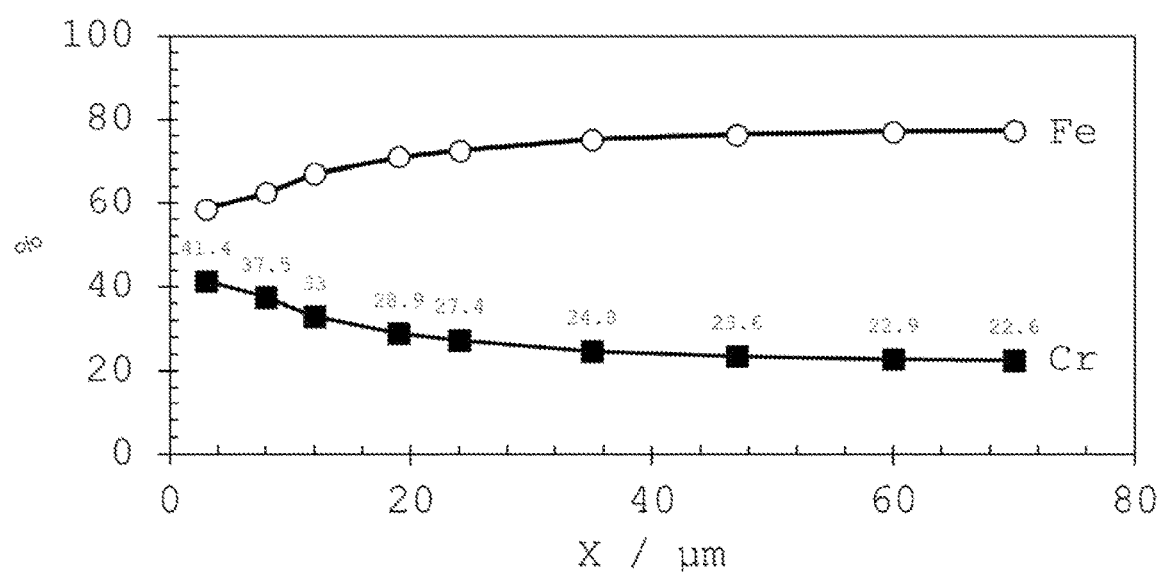
FIG. 3 is a graph showing the Fe and Cr content near the surface of a Crofer 22 APU plate after chromium upgrading.

FIG. 3 shows the Fe and Cr content near the surface of a Crofer 22 APU sheet after chromium upgrading. The elemental composition was determined by energy-dispersive X-ray spectroscopy (EDX) point analysis, performed at various depths, i.e. distance from the surface of the sheet (denoted as "X" in FIG. 3), of a cross-section of Crofer 22 APU sheet after chromium upgrading. The Cr and Fe content in the steel is expressed in units of wt % (denoted as "%" in FIG. 3). The original Crofer 22 APU sheet had a thickness of 300 microns and a chromium content of 22 wt %. Based on the EDX data, after chromium upgrading by chromizing process (process D) and a heat-treatment (process E), the chromium concentration near the surface of the chromium-upgraded metal sheet was higher than the Cr concentration in the ferritic steel before shaping (101). More specifically, the Cr content in the steel is ≥26 wt % up to a depth of approximately 25 microns from the surface of the sheet.

The invention claimed is:

1. A method for chromium upgrading of interconnects made of ferritic steel to be used in solid oxide cell stacks, comprising the steps of:
    shaping the interconnect,
    depositing a coating comprising Cr on at least one surface of the shaped interconnect,
    performing one or more thermal treatments at a temperature below 1000° C.,
    whereby the resulting Cr concentration near the surface of the interconnect is higher than the Cr concentration in the ferritic steel before shaping.

2. The method according to claim 1, wherein the average Cr concentration of the shaped interconnect is increased to 26 wt % Cr or higher.

3. The method according to claim 1, wherein the ferritic steel is a group 1 ferritic steel, group 2 ferritic steel, group 3 ferritic steel, group 4 ferritic steel or one of the following steels: Crofer22APU, Crofer22H, ZMG G10.

4. The method according to claim 3, wherein the ferritic steel is a group 2 ferritic steel.

5. The method according to claim 1, wherein the deposition step can be characterized as hard chromium plating.

6. The method according to claim 5, wherein the thickness of the deposited coating is at least 1 micron and less than 1 millimeter.

7. The method according to claim 1, wherein the deposition step is a chromizing process.

8. The method according to claim 1, wherein the shaping of the interconnect is carried out by forming.

9. The method according to claim 8, wherein the forming is carried out by stamping, pressing, forging, rolling, coining, embossing, extrusion, roll-forming, hydroforming or deep-drawing.

10. The method according to claim 8, wherein the pressing power used for forming of the interconnect is less than 500 bar.

11. The method according to claim 1, wherein the shaping of the interconnect is carried out by machining.

12. The method according to claim 11, wherein the machining is carried out by drilling, milling, photochemical etching, electrochemical etching, dry etching, or laser cutting.

13. The method according to claim 1, wherein the coefficient of thermal expansion of the interconnect after chromium upgrading is higher than 12 ppm/K, but lower than 13 ppm/K.

14. An interconnect of ferritic steel to be used in solid oxide cell stacks wherein the interconnects are prepared by the method according to claim 1.

15. The method according to claim 3, wherein the ferritic steel is AISI 430.

16. The method according to claim 8, wherein the pressing power used for forming of the interconnect is less than 200 bar.

* * * * *